United States Patent
Hawley

[15] 3,658,550
[45] Apr. 25, 1972

[54] METHOD FOR PRODUCING AN ARTIFICIAL ADIPOSE TISSUE

[72] Inventor: Robert L. Hawley, Webster Groves, Mo.

[73] Assignee: Ralston Purina Company, St. Louis, Mo.

[22] Filed: Oct. 16, 1969

[21] Appl. No.: 867,069

[52] U.S. Cl. ..................................................99/17
[51] Int. Cl. ..................................................A23j 3/00
[58] Field of Search..................99/14, 18, 17, 118, 178

[56] References Cited

UNITED STATES PATENTS

| | | | |
|---|---|---|---|
| 2,992,925 | 7/1961 | Green et al. | 99/131 |
| 3,482,998 | 12/1968 | Carroll et al. | 99/108 |
| 3,093,483 | 6/1963 | Ishler et al. | 99/131 |

Primary Examiner—Raymond N. Jones
Assistant Examiner—Roger B. Andewelt
Attorney—Robert W. Brukardt and Edward H. Renner

[57] ABSTRACT

A method is presented for producing artificial adipose tissue material which is capable of being cooked itself or incorporated into simulated meat products to give the appearance and cooking behavior of natural meat products, as well as impart a natural fatty flavor to the simulated meat product. The artificial adipose tissue is produced by reacting an aqueous solution of an alkali salt of alginic acid and a retarding agent with a fat dispersion of an alkaline earth metal salt to form an alginate gel matrix with the fat entrapped therein in small discrete droplets or globules, which are then slowly released by rupture of the walls enclosing these droplets during cooking to slowly baste the simulated meat as well as be somewhat retained within the gel matrix to impart a natural juicy taste to the simulated meat product.

4 Claims, No Drawings

METHOD FOR PRODUCING AN ARTIFICIAL ADIPOSE TISSUE

BACKGROUND OF THE INVENTION

This invention relates to a method of producing an artificial adipose tissue for use in simulated or artificial meat products.

There have been numerous attempts over the years to simulate natural meat products through the use of various vegetable proteins such as that disclosed in U. S. Pat. No. 2,682,466 and to improve their flavor by the addition of flavoring, as well as texturing of the protein to impart a meat-like consistency to it. An important feature of any desirable simulated meat product, however, lies in the ability to create an adipose tissue system resembling that of natural meat products. The adipose tissue in natural meat products is the connective tissue in which the fat is stored, and provides the meat with melting fats upon cooking to allow basting of the meat as well as imparting a smooth, pleasing taste to the meat when being chewed. Cells within natural adipose tissue are distended by droplets of fat and upon cooking rupture to slowly release the melted fat and thus impart an extremely pleasing taste to meat products in general, as well as a slow basting action during cooking.

Most simulated meat products have fallen short of being as flavorful as natural meat products by the lack of a successful adipose tissue system that will impart to the vegetable protein fat for basting during cooking, as well as a distinctive fatty taste when eaten. It is essential in order to simulate the taste and consistency of natural meat products that the fat be layered or incorporated in the artificial meats in small discrete drops or globules to simulate closely adipose tissue in natural meat products, which has the fat stored in discrete drops within cells of the animal tissue and which will in turn not bleed out in large amounts during cooking and which will also be somewhat retained upon cooking within the vegetable protein to impart the distinctive, pleasing fatty taste of natural meat.

Most attempts in the prior art have been limited to coating the vegetable protein with a fat as well as coating the protein with an emulsified mixture of a fat, protein and water to simulate the fatty consistency of natural meat products. Coating of the simulated meat product directly with the fat provides a suitable source of fat for basting of the artificial meat during cooking, although it rapidly melts and disappears and little of the fat remains in the artificial meat to impart the desirable meat-like taste to the artificial product. While the use of a fat, protein and water emulsion has been used to coat artificial meat products in order to simulate the fat system of naturally occurring meat products, it has some distinct disadvantages in that the fat bleeds easily when the artificial meat is cooked at a high temperature, particularly when fried as, for example, when the meat is in the form of a bacon slice, thus leaving little fat behind to provide a desirable flavor for the artificial meat product. A further disadvantage of the protein systems for creating a layer of fat on an artificial meat product lies in the complexity of incorporating this system in the artificial meat product, since it normally will be attached or layered to the artificial meat product by drying or otherwise mechanically attaching it to the artificial meat system. This not only causes the process to become very complex and uneconomical, but in addition, still falls short of closely simulating the adipose tissue system of natural meat products.

SUMMARY OF THE INVENTION

A new artificial adipose tissue system has therefore been developed which has been unexpectedly found to closely resemble that found in natural meat products in that it incorporates the fat within its matrix in small discrete droplets or globules in a manner approximating the storage of fat in connective animal tissue, and thus has the ability to rupture the walls enclosing the fat on cooking in the same manner as natural adipose tissue cells and provide a slow basting to the artificial meat product as well as retain a large percentage of fat within the unruptured matrix to provide the pleasurable taste and consistency associated with natural meat products.

The invention utilizes a gel as the matrix for the fat which is formed from the reaction between an alkali salt of alginic acid and alkaline earth cations from an alkaline earth metal salt. The alginate gel provides an extremely useful matrix for the incorporation of discrete droplets of fat within it and slowly releases these droplets on cooking to provide basting for the artificial meat as well as impart a flavorful taste to the artificial meat product after cooking. The gel is also incorporated into the artificial meat system to form a gelled meat product closely resembling natural meats and is then also separately attached to or incorporated within the gelled artificial meat system to simulate adipose tissue as found in natural meats. Since the artificial meat system also incorporates the artificial adipose tissue system, the adipose tissue which is added or incorporated, chemically bonds itself to the alginate gel in the simulated meat product, and thus allows easy application of the simulated adipose tissue without drying, heating or other mechanical manipulation.

It is therefore an object of the present invention to create a simulated meat system which has artificial adipose tissue closely resembling that of naturally occurring meat products.

It is a further object of the present invention to create an artificial adipose tissue system capable of having fat incorporated within it in small discrete droplets to closely resemble natural adipose tissue in taste and cooking behavior.

A further object of the present invention is to create an artificial adipose tissue which may be easily incorporated in a simulated meat product and which also incorporates the adipose tissue system, without drying or other mechanical manipulation of the simulated meat product.

Description of the Preferred Embodiments

In accordance with the present invention, an alkali salt of alginic acid, preferably sodium alginate, is dissolved in water to yield an aqueous solution of about 2 percent. The amount of alginate salt which may be used is not critical and depends on the strength of the gel desired. To this solution is added a retarding agent to slow the reaction between the alginate salt and an alkaline earth metal salt and thus allow easy mechanical manipulation of the resulting product as well as uniform dispersion of the fat within the unset gel system. The retarding agent is preferably a sodium salt of pyrophosphoric acid, such as tetrasodium pyrophosphate, but other salts of phosphoric acid are equally functional in the present invention. Salts of citric acid also perform well and the exact salt employed is not critical as long as the salt serves the purpose of temporarily chelating the alkaline earth cations to allow manipulation of the system before the gel between the alginic acid salt and the alkaline earth cations begins to form.

The retarding agent is added to the solution of the alginate salt, preferably in an amount to yield a final concentration of about 0.3 percent in the alginate salt solution. The amount of retarding agent which is employed in the present invention is in turn dependent on the amount of alkaline earth cations employed, and if a higher or lower percentage of alkaline earth cations is used, the amount of retarding agent should be proportionately increased or decreased, since there must be a sufficient amount to temporarily chelate the alkaline earth cations and allow uniform dispersion of the fat before the reaction between the alkaline earth cations and the alginate salt takes place.

A separate dispersion of a fat and the alkaline earth metal salt is then prepared, with the fat being used in an amount equal to the amount of water used in preparing the aqueous solution of the alginate salt and retarding agent. The exact alkaline earth metal salt which is employed in the present invention is not critical as long as it exhibits a solubility in water at room temperature between 0.09 to 10 parts per 100 parts of water. Among the alkaline earth metal salts which work well in the present invention are calcium sulfate and calcium gluconate. Since it is the alkaline earth cations which react with the alginate solution, the alkaline earth metal salt should be added in an amount to produce an alkaline earth cation concentration of not less than 5 percent nor more than 50 percent of the weight of the alginate salt employed. The preferable amount to be employed is the amount of alkaline earth metal salt required to produce alkaline earth cations which equal a concentration of 30 percent of the weight of alginate salt used. For example, if 4 gm. of sodium alginate is used and the alkaline earth metal salt employed is calcium sulfate, which contains about 30 percent calcium, then 4 gms. of calcium sulfate would be used, since it would yield a concentration of calcium cations of 1.2 gms. or 30 percent of the weight of alginate salt used. If the concentration of alkaline earth cations is above 50% of the weight of the alginate salt, it imparts an undesirable flavor to the artificial adipose tissue.

Mixing of the dispersion of fat and alkaline earth metal salt with the aqueous solution of the alginic acid salt and the retarding agent may be conveniently carried out at a temperature between 60° and 130° F., although the temperature should not exceed 200° F., since this results in a failure of the mixture to react and a gel of poor quality. The preferred temperature for mixing the fat dispersion with the aqueous alginate solution is at least 10° F. but not more than 40° F. above the melting point of the fat. This allows uniform and quick dispersion of the fat in the aqueous solution before the gel begins to form.

The particular fat which is employed in the present invention is not critical and may be either an animal or vegetable fat which is edible and suitable for food use. It is preferable that the fat employed be a solid at room temperature, since the use of a fat with a very low solidification point would be difficult to entrap within the gel system without bleeding out when the gel system is used in simulated meat products which are held at room temperature.

Mixing of the aqueous solution of the alginic acid salt and the alkaline earth metal salt containing fat dispersion should be carried out by mixing at moderate speed and should only employ the minimum amount of mixing needed to effect uniform fat dispersion in the aqueous solution. High speed or excessive mixing could shear or break the gel down and prevent proper setting of it with improper entrapment of fat globules therein.

The mixed aqueous alginic salt solution and fat dispersion may be conveniently incorporated in or poured over a simulated meat product to create adipose tissue of any thickness desired. In addition, the best effect of the artificial adipose tissue developed in the present invention is achieved by adding the artificial adipose tissue to a simulated meat system which also has the alginate gel system incorporated therein. This allows interfacial bonding of the adipose tissue system to the alginate gel of the simulated meat system without drying and with the resultant effect of creating a product with the artificial adipose tissue distributed throughout as well as on the surface, thus closely resembling the fatty marbling effect found in natural meat products of having the adipose tissue distributed throughout as well as on the surface. This can be achieved by mixing the protein fibers and the other meat system ingredients with the alginate solution and then mixing this with an aqueous solution or a fat dispersion of an alkaline earth metal salt and then adding the artificial adipose tissue system to the gel; the two systems then gel together. This process can be repeated to provide alternate layers, if desired, of a gelled meat system and artificial adipose tissue system to achieve a simulated meat product of the desired thickness and consistency.

Suitable flavorings or spices to impart a general or particular meaty taste to the simulated meat product may be conveniently added to the fat dispersion of the alkaline earth metal salt or the aqueous solution of the alginic acid salt, as well as within the gelled meat system. Likewise, coloring of various types which would be suitable for food use may be added to impart a pleasing appearance to the adipose tissue itself or to a meat product when the system is incorporated in a simulated meat product. Proteins of various types may also be conveniently added to the aqueous alginic acid salt solution to effect their incorporation in the artificial adipose tissue and enhance its nutritive quality. Vegetable proteins of various types to include soy or cottonseed protein may be employed as well as animal proteins to include albumin and casein. It is a further advantage of the present invention that these proteins may be incorporated into the adipose tissue system, since these tend to brown the artificial adipose tissue and impart a crisp consistency to it if fried, as well as cause a desirable browning of the artificial adipose tissue when roasted, to closely resemble the browning effect seen on roasting or frying of naturally occurring meat products. Albumin is particularly good for this purpose, since it browns readily and does not require a high temperature to produce the effect.

The advantages of the present invention will become further apparent from the following examples, it being understood, however, that these examples are merely illustrative and are not intended as indicating limitations of either the method or the products produced thereby.

EXAMPLE 1

Simulated roast ham containing the artificial adipose tissue as embodied in the present invention was prepared. The simulated ham system was prepared according to the following formula:

| | |
|---|---|
| Soy Protein Fiber | 250 gm. |
| Albumin | 30 gm. |
| Salt | 3 gm. |
| Dextrose | 10 gm. |
| Trisodium Phosphate (10% solution) | 10 gm. |
| Water | 50 gm. |
| Ham Flavor | 13 gm. |
| Hydrolyzed Vegetable Protein | 3 gm. |
| Antolyzed Yeast | 3 gm. |
| FD&C Red 02 (1/500 solution) | 7 gm. |
| Smoke Flavor | 2 gm. |

All ingredients for the simulated ham system were mixed, with the exception of the soy protein fiber which was cut into 1 inch lengths and then added to the ingredient mixture and mixed well. A calcium system containing:

| | |
|---|---|
| Calcium gluconate | 15 gm. |
| Water | 20 gm. | was then added to the ham system and mixed. To the mixture of the ham and calcium system was added the alginate system which contained:

| | |
|---|---|
| Sodium Alginate | 10 gm. |
| Water | 300 gm. |
| Tetrasodium Pyrophosphate | 0.6 gm. |

This was mixed uniformly and the simulated ham system was placed in a mold in a layer of about 1 inch thick. The artificial adipose tissue system was then prepared by previously mixing a separate solution of an alginate salt which contained:

| | |
|---|---|
| Sodium Alginate | 4 gm. |
| Water | 200 gm. |
| Tetrasodium Phosphate | 0.6 gm. |
| Albumin | 5 gm. | and then preparing a fat dispersion containing calcium ions by mixing 200 gm. of an animal fat melted at 150° F. and 4 gm. of calcium sulfate. This dispersion was then mixed with the alginate solution and a one-half inch layer of the artificial adipose tissue system was poured over the ham system, followed by another 1 inch layer of the ham system and another one-half inch layer of adipose tissue on top of this. The simulated meat product was allowed to gel and was then removed from the mold. This simulated ham roast is suitable for roasting or cooking and was then placed in a pan and roasted at 325° F. for 2½ hours.

EXAMPLE 2

A simulated bacon slice which incorporates the artificial adipose tissue system was prepared. The simulated bacon system was prepared according to the following formula:

| | |
|---|---|
| Soy Protein Fiber | 250 gm. |
| Albumin | 30 gm. |
| Salt | 3 gm. |
| Dextrose | 10 gm. |
| Trisodium Phosphate (10% solution) | 30 gm. |
| FD&C Red 02 (1/500 solution) | 7 gm. |
| Water | 50 gm. |
| Smoke Flavor | 2 gm. |
| Bacon Flavor | 5 gm. |

All ingredients for the simulated bacon system were mixed slowly and the soy protein fiber was cut into 1 inch pieces, added to the mixture and thoroughly mixed. An alginate system was then prepared which contained:

| | |
|---|---|
| Sodium Alginate | 10 gm. |
| Water | 300 gm. |
| Tetrasodium Pyrophosphate | 0.6 gm. |

This was mixed to form a solution and added to the simulated bacon system and thoroughly mixed. A calcium system was then prepared by mixing:

| | |
|---|---|
| Calcium Gluconate | 20 gm. |
| Water | 20 gm. | which was then added to the mixture of the alginate and bacon system and poured into a pan to create a layer of about 1 inch. The artificial adipose tissue system was then prepared by previously mixing a separate solution of an alginate salt which contained:

| | |
|---|---|
| Sodium Alginate | 4 gm. |
| Water | 200 gm. |
| Tetrasodium Phosphate | 0.6 gm. | and then preparing a fat dispersion containing calcium ions by mixing 200 gm. of an animal fat melted at 140° F. and 4 gm. of calcium sulfate. This dispersion was then mixed with the alginate solution and poured over the simulated bacon system to form about a one-half inch layer. The simulated bacon system was again poured over the layer of the artificial adipose tissue, followed by another layer of the adipose tissue system. The layered mixture was allowed to gel and then removed from the pan. The resulting product resembled a side of bacon and could be then conveniently sliced at room temperature and the simulated bacon strips fried in a pan in the same manner as natural bacon.

Some changes may be made in the details or methods of my invention without departing from the spirit and purpose of it, and it is intended to cover by the claims any modifications or equivalents which may be included within their scope.

I claim:

1. A method of producing a simulated meat product derived from vegetable protein having an artificial adipose tissue system, and which resembles a natural meat product in flavor and cooking behavior comprising; forming a simulated meat product having a gel matrix by mixing of a vegetable protein fibrous material, an aqueous solution of an alkali salt of alginic acid, and a retarding agent and adding thereto an alkaline earth metal salt; forming an artificial adipose tissue system by uniformly mixing a dispersion of an alkaline earth metal salt having a water solubility of between about 0.09 and 10 parts of salt per 100 parts of water, and a fat in a liquid state with a solution of an alkali salt of alginic acid and a retarding agent to form an alginate gel matrix with the fat entrapped therein in small, discrete droplets, and combining said simulated meat product and said artificial adipose tissue system to produce a simulated meat product with an artificial adipose tissue system, which resembles a natural meat product in flavor and cooking behavior.

2. A method of producing a simulated meat product as set forth in claim 1 wherein the alkali salt of alginic acid is sodium alginate.

3. A method of producing a simulated meat product as set forth in claim 1 wherein the retarding agent is selected from the group consisting of salts of phosphoric and citric acid.

4. A method of producing a simulated meat product as set forth in claim 1 wherein the alkaline earth metal salt is selected from the group consisting of calcium sulfate and calcium gluconate.

* * * * *